(12) United States Patent
Bales et al.

(10) Patent No.: US 6,930,433 B2
(45) Date of Patent: Aug. 16, 2005

(54) BRUSHLESS ELECTRO-MECHANICAL DEVICE

(75) Inventors: John E. Bales, Brush Prairie, WA (US); Tom Long, Portland, OR (US); J. Lynn Saunders, Hillsboro, OR (US); Mohamed Sabri, Hillsboro, OR (US)

(73) Assignee: Apex Drives Laboratories, Inc., Portland, OR (US)

( * ) Notice: Subject to any disclaimer, the term of this patent is extended or adjusted under 35 U.S.C. 154(b) by 0 days.

(21) Appl. No.: 10/634,511

(22) Filed: Aug. 4, 2003

(65) Prior Publication Data

US 2004/0207286 A1 Oct. 21, 2004

Related U.S. Application Data

(63) Continuation-in-part of application No. 10/417,713, filed on Apr. 16, 2003.

(51) Int. Cl.$^7$ .............................................. H02K 21/12
(52) U.S. Cl. .................................. 310/268; 310/156.35
(58) Field of Search ...................... 310/156.35, 156.32, 310/112, 261, 266, 267, 268, 254, 258, 259

(56) References Cited

U.S. PATENT DOCUMENTS

| | | | |
|---|---|---|---|
| 2,567,422 A | 9/1951 | Camp | 101/322 |
| 2,994,023 A | 7/1961 | Devol | 264/272.21 |
| 3,700,942 A | 10/1972 | Alth | 310/164 |
| 4,103,197 A | 7/1978 | Ikegami et al. | 310/267 |
| 4,190,779 A | 2/1980 | Schaeffer | 310/12 |

(Continued)

FOREIGN PATENT DOCUMENTS

| | | |
|---|---|---|
| GB | 2139430 | 5/1983 |
| JP | 61035145 | 2/1986 |
| JP | 61214763 | 9/1986 |
| JP | 61221563 | 10/1986 |
| JP | 63121460 | 5/1988 |
| JP | 4087543 | 3/1992 |

OTHER PUBLICATIONS

Cho,Chahee Peter, Doctor of Philosophy, Dissertation—University of New Hampshire, "Analysis and Design Considerations of a High Power Density, Dual Air Gap, Axial–Field, Brushless, Permanent Magnet Motor," 1995 (entire hardbound book submitted).

Hanselman, Duane C., "Brushless Permanent–Magnet Motor Design," University of Maine, Orono, Maine, McGraw–Hill, Inc., 1994, pp. 1–192.

Prina, Steven R., "Considerations in the Design of Brushless DC Motors," Parker Hannifin Corp, Parker Motor Design Center, Portsmouth, New Hampshire, 1992.

*Primary Examiner*—Dang Le
(74) *Attorney, Agent, or Firm*—Paul J. Fordenbacher, Esq; Silicon Forest Patent Group

(57) ABSTRACT

An electromotive machine having a stator element and a rotor element, the stator element including at least one set of N preferably toroidally shaped electromagnetic members, the electromagnetic members arranged along an arc a predetermined distance apart defining a stator arc length. Each of the members has a slot, and the rotor element includes a disc adapted to pass through the slots. The disc contains a plurality of permanent magnet members spaced side by side about a periphery thereof and arranged so as to have alternating north-south polarities. These permanent magnet members are sized and spaced such that within the stator arc length the ratio of stator members to permanent magnet members is N to N+1, where N is the number of electrical excitation phases applied to the electromagnets. The electromagnetic members are energized to create high torque and smooth operation.

16 Claims, 11 Drawing Sheets

U.S. PATENT DOCUMENTS

| | | | |
|---|---|---|---|
| 4,315,171 A | 2/1982 | Schaeffer | 310/49 R |
| 4,547,713 A | 10/1985 | Langley et al. | 318/254 |
| 4,605,874 A | 8/1986 | Whiteley | 318/268 |
| 4,639,626 A | 1/1987 | McGee | 310/155 |
| 4,654,551 A | 3/1987 | Farr | 310/112 |
| 4,757,220 A * | 7/1988 | Pouillange | 310/49 R |
| 4,758,756 A * | 7/1988 | Pouillange | 310/152 |
| 4,866,321 A | 9/1989 | Blanchard et al. | 310/112 |
| 5,044,897 A | 9/1991 | Dorman | 417/423.7 |
| 5,079,467 A | 1/1992 | Dorman | 310/156 |
| 5,148,069 A | 9/1992 | Nonaka et al. | 310/68 R |
| 5,179,307 A | 1/1993 | Porter | 310/68 B |
| 5,334,898 A | 8/1994 | Skybyk | 310/298 |
| 5,677,605 A | 10/1997 | Cambier et al. | 318/254 |
| 5,696,419 A | 12/1997 | Rakestraw et al. | 290/43 |
| 5,744,896 A | 4/1998 | Kessinger, Jr. et al. | 310/268 |
| 5,786,645 A | 7/1998 | Obidniak | 310/254 |
| 5,798,591 A | 8/1998 | Lillington et al. | 310/164 |
| 5,798,594 A | 8/1998 | Radovsky | 310/180 |
| 5,854,521 A | 12/1998 | Nolle | 310/12 |
| 6,046,523 A | 4/2000 | Bailey | 310/156 |
| 6,049,197 A | 4/2000 | Caamano | 322/89 |
| 6,071,093 A | 6/2000 | Hart | 471/424.2 |

\* cited by examiner

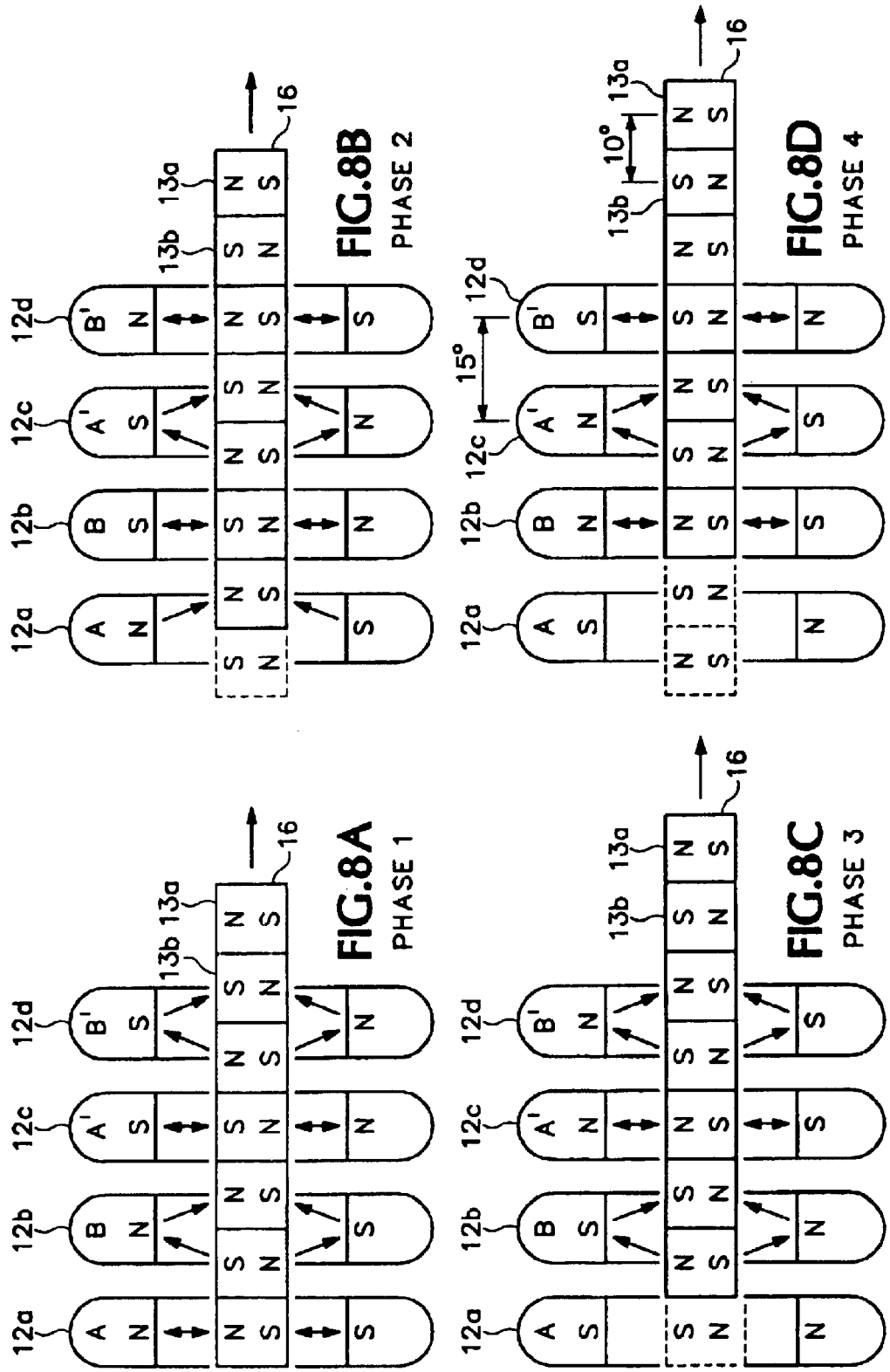

BRUSHLESS ELECTRO-MECHANICAL DEVICE

This application is a continuation in part of U.S. application Ser. No. 10/417,713 filed Apr. 16, 2003.

BACKGROUND OF THE INVENTION

The following invention relates to a brushless electromechanical machine for converting electrical energy into mechanical motion and vice-versa. More specifically, the invention relates to an electric motor/generator having self-starting capabilities, high torque and increased efficiency.

Electric motors employing brushes are characterized by low efficiency and require elaborate starter mechanisms. Recently, a type of brushless motor has been developed which employs an electromagnet having a stator comprised of a plurality of toroidal pole pieces. The pole pieces each have a narrow gap to permit the passage of a disk shaped rotor. The rotor includes a plurality of permanent magnet members spaced about the periphery of the disk. As the permanent magnet members pass through the gap in the stator poles, the magnetic circuit is completed. With appropriate switching circuitry, this combination can be made to function as a brushless electric motor. An example of such construction is shown in the Porter U.S. Pat. No. 5,179,307.

In the Porter motor, the permanent magnets on the rotor are widely spaced apart. The rotor is a disk having permanent magnet members situated about its periphery and spaced 36.degree. apart. The driving circuitry is triggered by combinations of light emitting diodes and photosensitive transistors arranged on opposite sides of the rotor disk. Apertures in the rotor disk permit light from and LED to fall on a photosensitive transistor at appropriate points in the rotation of the rotor disk. This causes the driving current to cause current to flow in the coil.

A problem with the motor of the '307 patent is that the permanent magnets are spaced too far apart about the periphery of the rotor disk for the machine to operate efficiently. This wide spacing of permanent magnet members would require a large mass rotor operating as a flywheel with enough energy stored in the rotor to provide considerable rotational momentum. A large mass rotor, however, would be impossible to start without some type of auxiliary starter mechanism. Additionally, this motor cannot easily reverse its direction.

BRIEF SUMMARY OF THE INVENTION

The present invention provides a construction for an electromotive machine which can be either an electric motor or a generator. The electromotive machine includes a stator element and a rotor element where the stator element includes at least one set of four toroidally shaped electromagnetic members where the electromagnetic members are arranged spaced apart along an arc to define a stator arc length. Each of the electromagnetic members includes a slot and a rotor element comprising a disk adapted to pass through the aligned slots of the electromagnetic members. The rotor contains a plurality of permanent magnet members spaced side-by-side about a periphery of the disk and arranged so as to have alternating north/south polarities. The permanent magnet members are sized and spaced such that within the stator arc length, the ratio of stator members to permanent magnet members is about 4 to 6.

Although the electromotive machine of the invention will work with one set of four toroidal electromagnets, a second set may be positioned symmetrically along a circular arc defined by the first set. Additional sets of four toroidal electromagnetic members may be used if desired.

The machine includes at least one motor drive electronics module for energizing the toroidal electromagnetic members with current according to a predetermined sequence. The sequence is triggered by Hall effect sensors placed adjacent the electromagnetic members along the arc. The Hall effect sensors sense changes in the magnetic field and provides trigger signals to the electronics module so that the electronics module can energize the electromagnetic members in a predetermined sequence. Since the ratio of electromagnet stator members to permanent magnets on the outer periphery of the disk is about 4 to 6, the toroidal electromagnets are operated in push-pull fashion in which switching occurs when a pair of magnets passes the centerline of an electromagnetic member.

The machine may also be operated in reverse as a generator using the rotor as a mechanical input device. In this configuration current induced in the coils by the turning of the rotor charges a battery. In an automobile, for example, the machine may operate first as a starter motor and then switch over to an alternator.

Also in accordance with preferred embodiments of the present invention, the ratio of permanent magnets is not limited to 3:2 but is extended to N+1:N, where N is the number of electrical phases, as will be described more fully hereinafter.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIGS. 8A–8D represents a schematic view of the toroidal electromagnetic members and the permanent magnet members illustrating the four-phase switching characteristics of the electronics driver module of FIG. 3.

DETAILED DESCRIPTION OF THE PREFERRED EMBODIMENT

Figure 1:
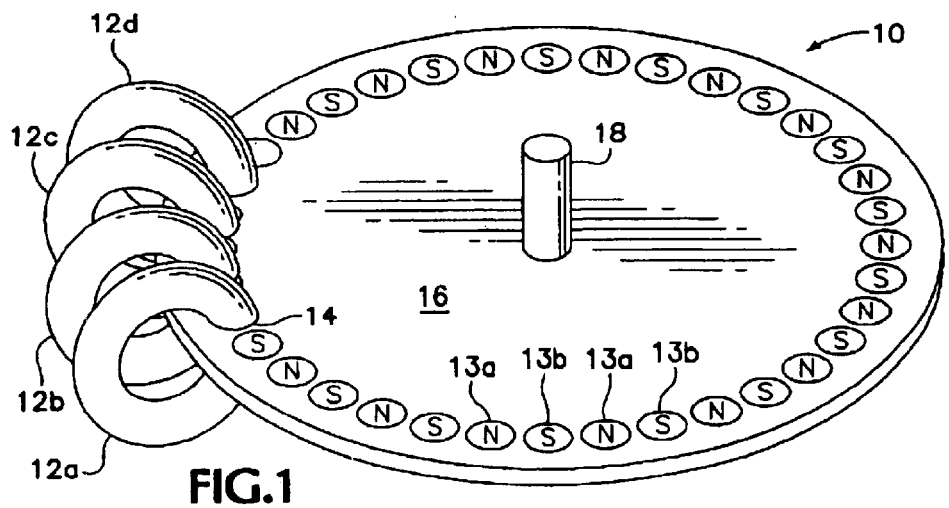
FIG. 1 is a perspective schematic view of the electromechanical machine of the present invention.

An electromechanical machine 10 is shown schematically in FIG. 1. The machine 10 includes a plurality of toroidally shaped electromagnets 12. There are four such electromagnets 12a, 12b, 12c and 12d. The electromagnets 12a–d are arranged along an arc having a predetermined length. Each of the electromagnets is toroidally shaped and each has a gap 14 (refer to FIG. 2A). The gaps 14 are aligned which permits the outer edge of a wheel or disk 16 to pass through them. The disk 16 has an output shaft 18 which may be coupled to any suitable device such as a fan or a tub for a washing machine (not shown). The output shaft could also be coupled to some source of rotational energy such as a drive shaft. In this configuration, the motor is initially used as a starter motor and then switches into a generator or alternator mode.

The disk includes a plurality of permanent magnet members 13a, 13b which are arranged in alternate north-south polarity. The magnets 13a, b are sized and spaced so that within the stator arc length the ratio of toroid electromagnets 12a–d to permanent magnets 13a, b is always about 4 to 6. The permanent magnets are closely spaced, having spaces between each adjacent magnet that does not exceed 10% of the diameter of the uniformly sizes magnets 13a, b.

Figure 2:
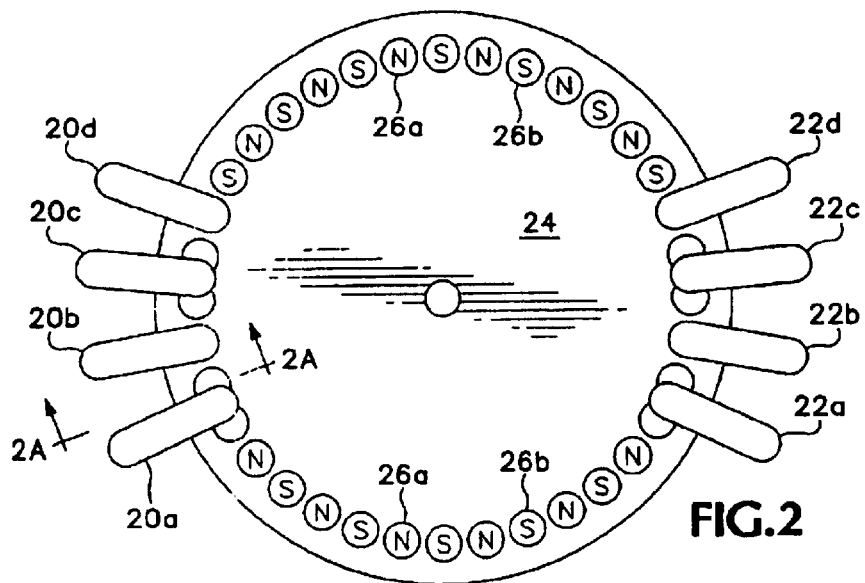
FIG. 2 is a top view of the electromechanical machine of the present invention employing two sets of electromagnetic members.
Figure 2A:
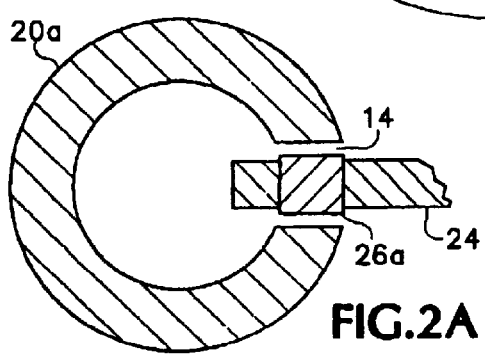
FIG. 2A is a side cutaway view of FIG. 2 taken along line 2—2.

Referring to FIG. 2, if desired, two groups of electromagnet members 20 and 22, respectively, may be used. Each of the sets 20 and 22 contains at least four (4) toroidal electromagnet members 22a–d and 20a–d respectively. Further, if desired, more sets of electromagnet members may be used depending upon the type of application desired. Each of the electromagnetic members in a set contains a slot and the slots are aligned along an arc allowing the flywheel 24 to pass through the slots. As in the example of FIG. 1, the flywheel 24 includes a plurality of permanent magnet members 26 having alternating north-south polarities about the periphery of the flywheel 24 that are in all respects the same as magnets 13a, 13b.

The electromechanical machine of the present invention may be configured to operate either as a motor or as a generator. For example, when acting as a motor or a motor/starter, the electromagnets 12a–d are electronically switched in polarity to attract and then repel the appropriate permanent magnets 13a, b in the flywheel. This applies a rotational force to the flywheel and spins the output shaft 18. Since there are no mechanical gears needed, the starting action is silent. Conventional automotive starter motors, however, are noisy. Once the engine is running, the machine can be converted to a generator by decoupling the driving electronics module. The permanent magnets 13a, b moving past the electromagnets 12a–d with the driving circuitry now switched off can be used to generate electrical power.

Toroidal cores are used for the electromagnets in this machine since they are the most efficient transformer core configuration. Toroidal electromagnets are self-shielding since most of the flux lines are contained within the core. In addition, the flux lines are essentially uniform over the entire length of the magnetic path. The slot 14 that is formed in each of the toroidal electromagnetic members would normally cause a decrease in flux density. However, the action of the moving permanent magnet members keeps the gap filled with permanent magnet material and thus maintains the field integrity within the core.

Figure 3:
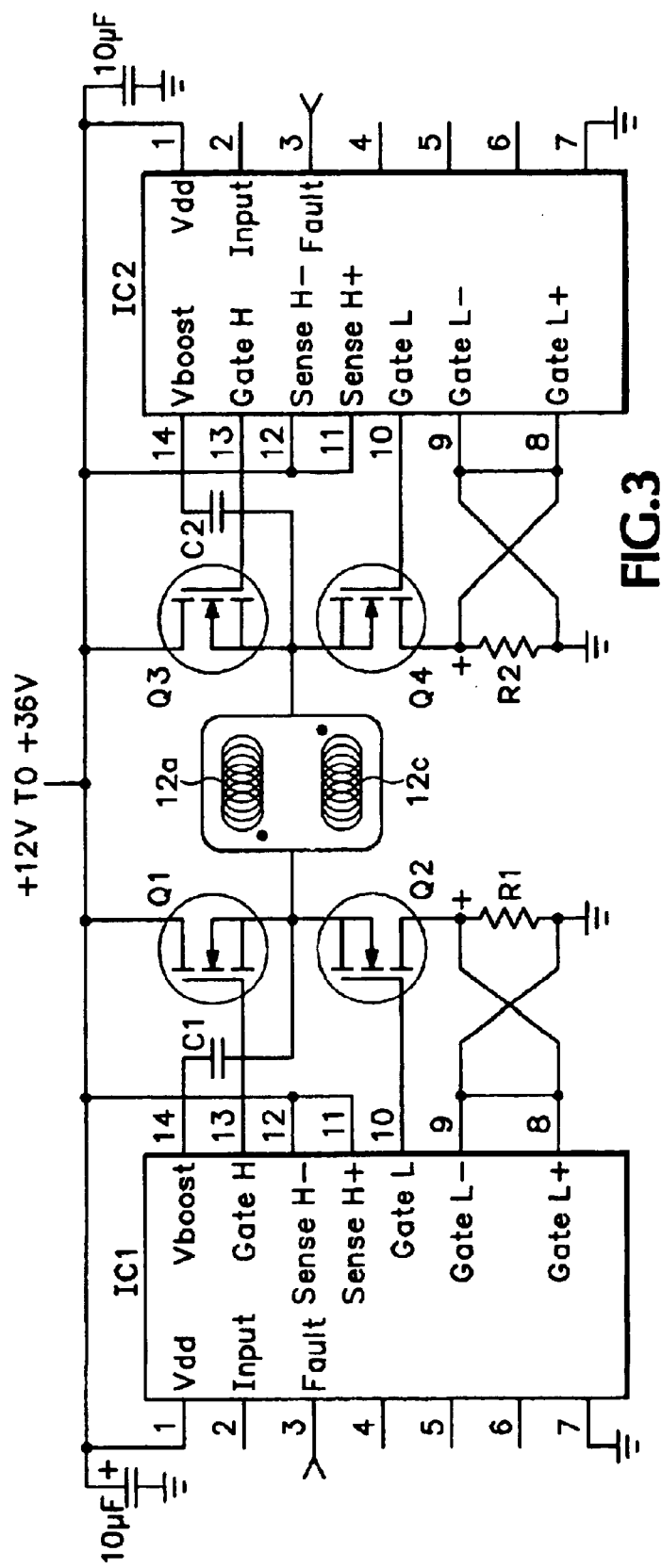
FIG. 3 is a schematic diagram of a drive module for use when the electromechanical machine is being used as an electric motor.

Referring to FIG. 3, a pair of integrated circuits IC1 and IC2 are coupled to two electromagnet members consisting of electromagnets 12a and 12c. It will be appreciated that an identical electronics module would be used to drive electromagnets 12b and 12d. The ICs, IC1 and IC2, have output gates coupled to transistors Q1, Q2, Q3 and Q4 respectively. IC1 and IC2 are half bridge MOSFET drivers which are triggered by Hall effect sensor IC5, (refer to FIG. 4). The Hall effect sensor IC5 has its outputs coupled to the inputs of IC1 and IC2, respectively. Output line IC5, pin 2 is coupled to the input line at pin 2 of IC1. Similarly, output line IC5, pin 3 is coupled to input line 2 of IC2. There is another Hall effect sensor (not shown) for electromagnets 12b and 12d which operates the same way but which is positioned so as to generate its signal at a phase angle which lags the signal from IC5. The result is that electromagnetic member pairs are energized 180.degree. out of phase with each other. This is illustrated by the timing diagram of FIG. 6.

Figure 6:
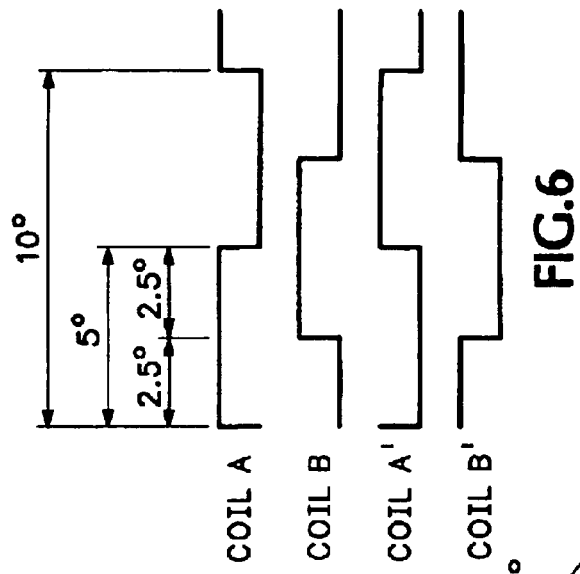
FIG. 6 is a timing diagram illustrating the switching characteristics of the electronic drive module of FIG. 3.

FIG. 6 shows a four-phase timing diagram that repeats for every 10.degree. of rotation of the rotor 16. The magnets 13a, b are spaced 10.degree. apart while the electromagnetic members 12a–d are spaced 15.degree. apart. The timing relationship between the magnets and the coils is shown best in FIGS. 8A–8D. As will be appreciated by those of skill in the art, the illustrated relationship defines four repeating commutation intervals.

The arrows in FIG. 8 for each phase indicate the lines of attraction and/or repulsion between the permanent magnets and the coils based upon the polarity of the energizing current from the driver module pairs of IC's of FIG. 3. FIG. 8 illustrates schematically the waveform of FIG. 6. IC1 and IC2 generate driver currents 180.degree. out of phase so that when coil 12a is high, 12c is low and vice versa. Another driver module pair of IC's (not shown) does the same thing with coils 12b, 12d but out of phase with respect to toroidal coils 12a, 12c by 5.degree. The Hall sensors are placed along the stator in advance of the rotor and are spaced apart by 5.degree. in order to trigger their respective IC's at a phase angle difference of 5.degree. The result is a very smooth rotor drive made possible by the sizing and spacing of the magnets so that the ratio of coils to magnets within the arc length of the electromagnet members 12a–12d is always 4 to 6. Thus, a pair of alternate north-south pole magnets are experiencing opposite polarity fields when they are centered within the gaps of alternate electromagnets 12a, 12c, while north-south pairs of magnets, each halfway within the slots of the other pair of electromagnets 12b, 12d, are experiencing the switching of the polarity of current through those electromagnets 12b, d.

Figure 7:
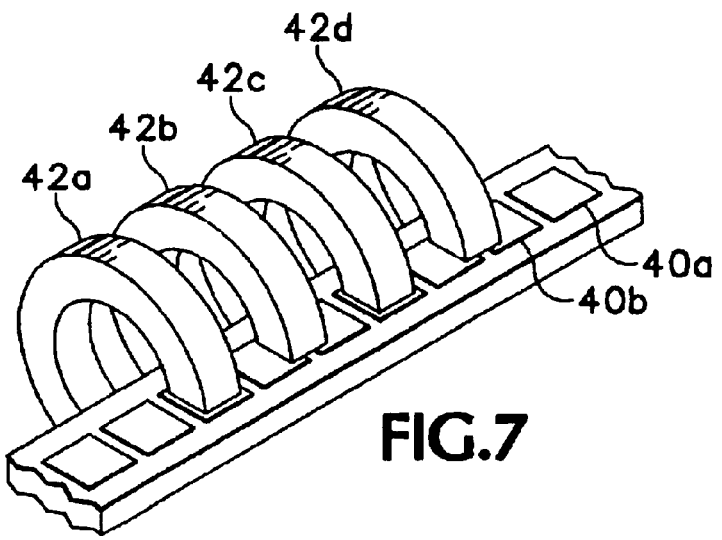
FIG. 7 is a partial perspective view of the electromechanical machine of the present invention configured as a linear actuator.

Referring to FIG. 7 the machine of the present invention may be operated as a linear actuator. In this embodiment the magnets may be of a rectangular shape. In this case, the stator arc length is measured along a straight line and it should be understood that the term stator arc length need have no particular shape as it may be used with stator/rotor configurations of differing types. In addition, the magnets need have no particular shape to be effective. As long as the ratio of electromagnetic members to permanent magnets is about 4 to 6 within the arc length occupied by the stator coils, the invention will operate as desired.

Figure 9:
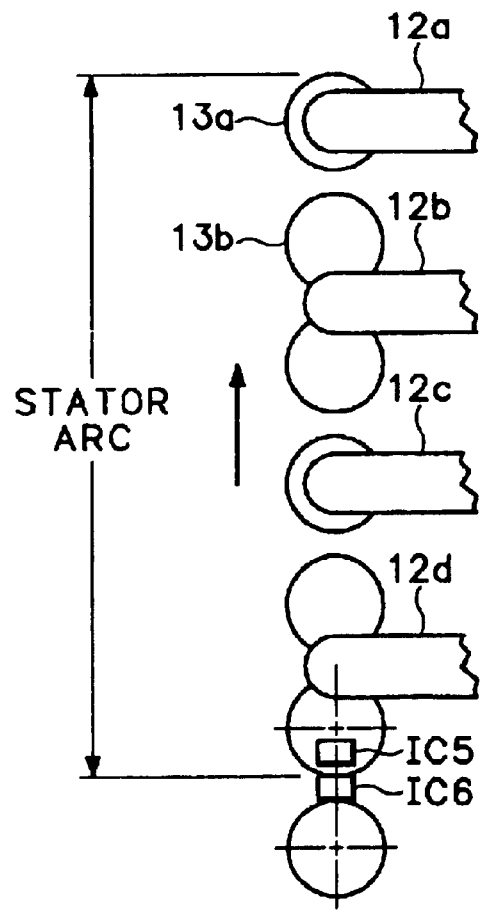
FIG. 9 is a partial top view of an electromotive machine of the invention.

Referring to FIG. 9, the Hall sensors IC5 and IC6 are spaced apart by 5.degree. radially so that trigger signals will be generated in the proper phase with each other. The Hall sensors are affixed to a stator housing (not shown). It can be appreciated from FIG. 9 that the term "stator arc length" includes an arc that is slightly longer than the length between each end of the 4 electromagnets 12a–d and includes areas where the fields generated by those electromagnetic members influence the permanent magnets 13a, b. In FIG. 9, this area is indicated by the dashed lines. Although the arc in FIG. 9 has been shown as substantially a straight line, it is to be understood that it may represent either a linear device or a circular arc.

Figure 10:
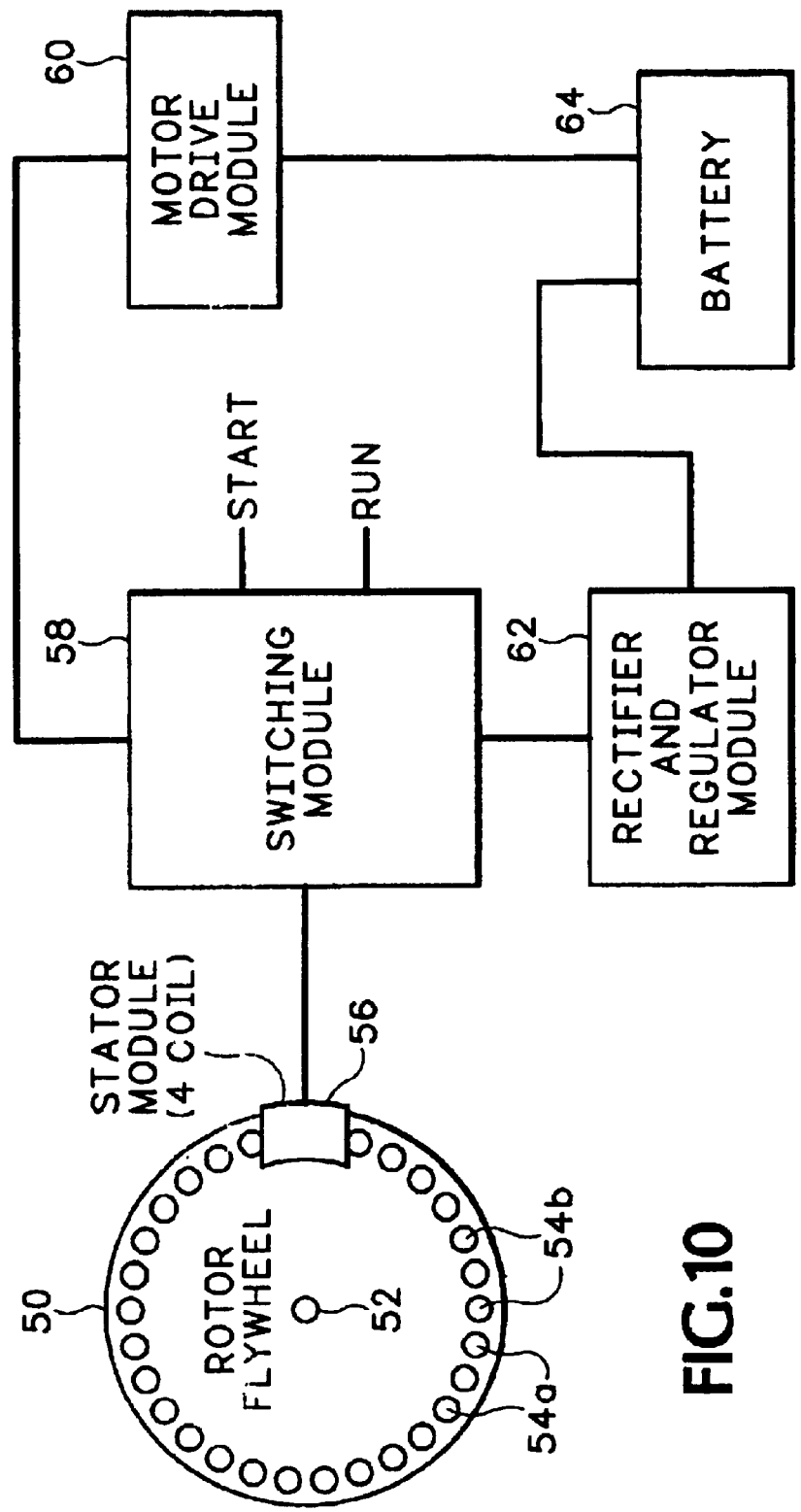
FIG. 10 is a schematic diagram of a circuit employing the invention as a combination starter motor and alternator.

Referring to FIG. 10, a rotor or flywheel 50 is coupled to a shaft 52 which may in turn be coupled to the drivetrain of an automobile (not shown). Permanent magnets 54a (North polarity) and 54b (South polarity) are situated about the periphery of the rotor 50. A stator module 56 is situated adjacent the rotor 50 and includes a set of four toroidal electromagnetic members having substantially the same configuration as shown in FIG. 1. A switching module 58 switches between a circuit that accepts an input from a motor drive module 60 and one that provides an output to a rectifier and regulator module 62. The regulator module 62 charges a battery 64.

Signals on input lines labeled "start" and "run" respectively control the function of the switching module 58. In the start mode a circuit like the circuit of FIG. 3 is turned on in the switching module. Once the motor (not shown) has been turned on, a signal is provided to the "run" line turning off the circuit of FIG. 3 and allowing current from the stator module 56 to flow directly to the rectifier and regulator module 62.

While much of the foregoing description was based on an exemplary two-phase embodiment of a self-starting electromotor-type machine, alternative preferred embodiments of the present invention are based on three-phase or poly-phase principles. Additional description of such poly-phase embodiments will now be described.

Figure 5:
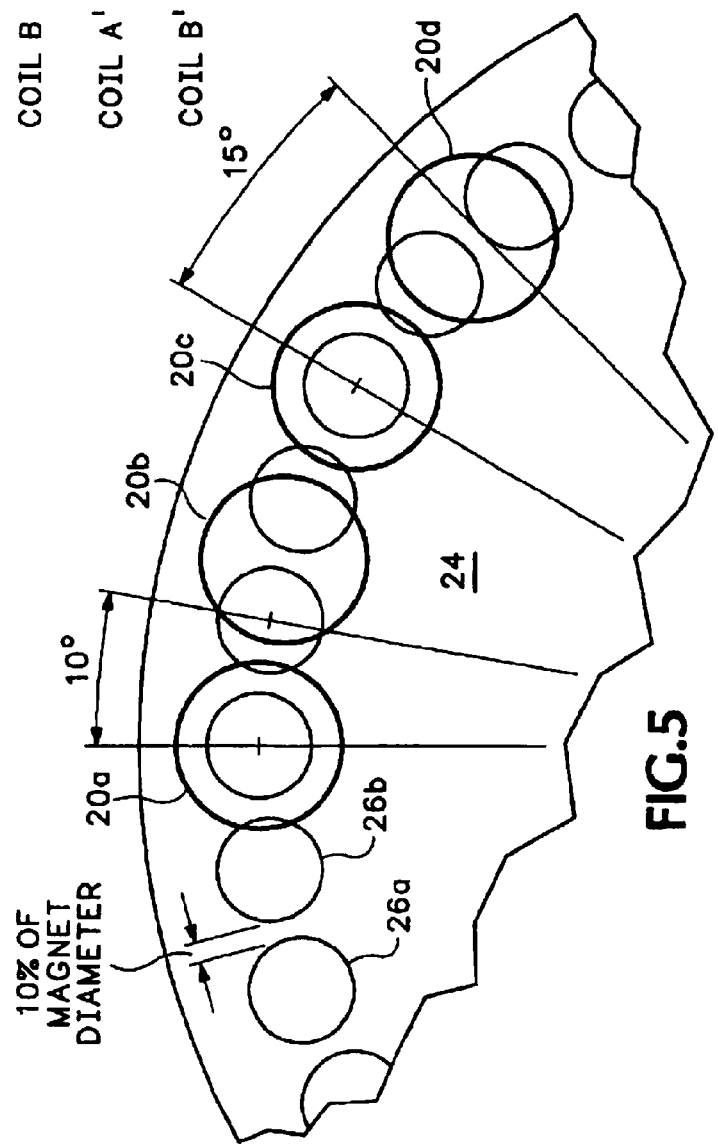
FIG. 5 is a partial plan schematic view of the electromechanical machine of FIG. 1.

Two-phase embodiments, such as previously described, are desirable in many applications in terms of cost, performance, efficiency, etc., but a magnet spacing/electromagnet spacing in the ratio of 4 to 6 (or 2 to 3) tends to produce an angular dependent rotational torque (or linear force if a linear motor) that varies with the angle (or displacement). This torque (or force) is produced by the attraction or repulsion of the magnetic fields of the magnets and electromagnets and repetitively goes through zero torque (or force) for each magnet/electromagnet pair. The timing of such previously-described embodiments is controlled or determined by the 4 to 6 (2 to 3) ratio of the magnet spacing/electromagnet spacing (i.e., e.g., 10 degrees and 15 degrees (2 to 3)). The resulting torque (force) of the combined magnet/electromagnet pairs in a system timed as shown in FIGS. 5 and 6 will at times have two magnet/electromagnet pairs producing torque (force) while two go through zero torque (force). As the motor rotates the torque generally is produced in two phase pairs. A phase pair includes forces in the same direction but produced by opposite polarity of magnetic fields. However, the forces in the phase pairs occur in phase with themselves (zero lead or lag), and thus in such embodiments a two phase torque (force) is produced.

Figure 11B:
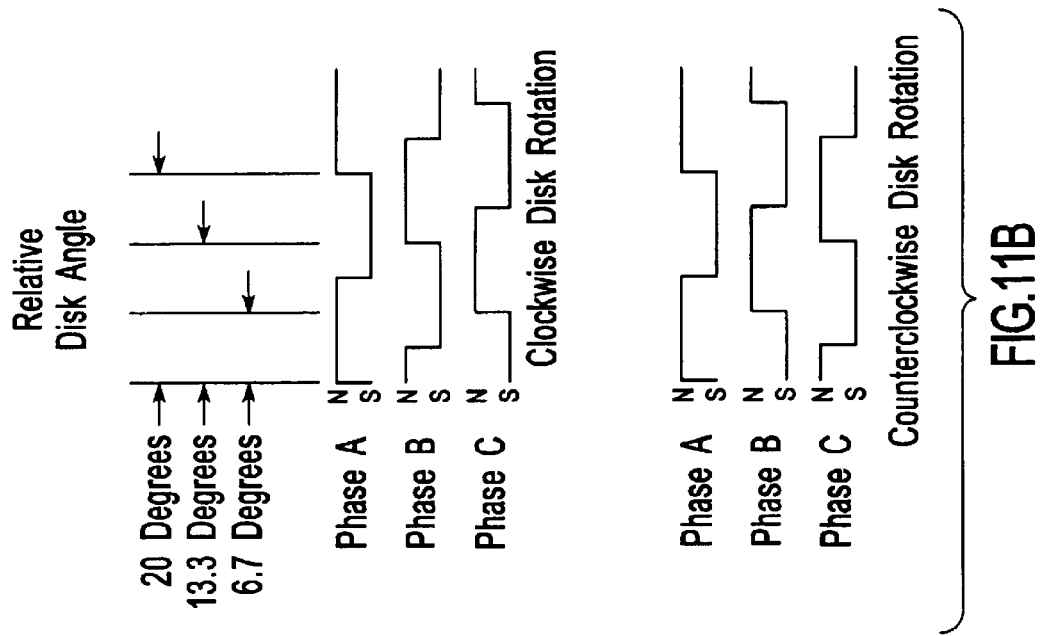
FIGS. 11A, 11B and 12A–12G illustrate aspects of three or other poly-phase alternative preferred embodiments of the present invention.
Figure 11A:
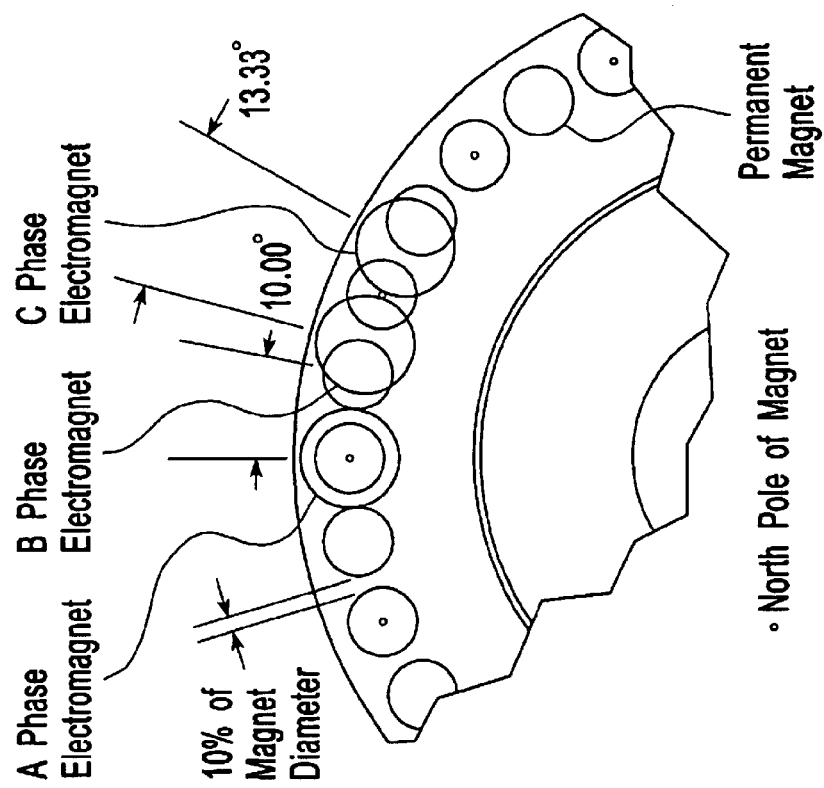

In alternative preferred embodiments, for example, a three-phase or poly-phase arrangement is utilized. As an exemplary additional embodiment, an arrangement of magnet spacing/electromagnet spacing in the ratio of 3 to 4 (i.e., e.g., 10 degrees and 13½ degrees) is utilized. The forces from magnet/electromagnet couples are arranged so that while one couple goes through a zero, the other two continue to produce force. FIGS. 11A and 11B illustrate an exemplary magnet/electromagnet configuration and waveform timing diagram, respectively, for such an alternative embodiment.

Figure 4:
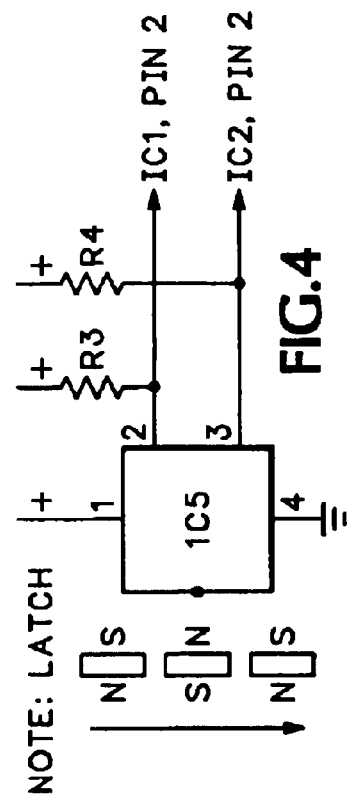
FIG. 4 is a schematic diagram of a Hall effect sensor used in connection with the electronic drive module of FIG. 3.

In the embodiment of FIG. 11A, the basic set of electromagnets, which as in previously disclosed embodiments may be arranged to have multiple sets, consists of three electromagnets, herein referred to as A, B and C. FIG. 11B includes waveforms for coil A, coil B and coil C of the three electromagnets of the set. In accordance with such embodiments, the preferred phase shift from one coil to the other would be 60 degrees of the minor cycle rather than 90 degrees. The minor cycle is defined to be the duration of movement necessary to cause a north/south magnet pair to cross the axis of a fixed electromagnet. In the previously described two-phase embodiments, this would repeat 18 times per revolution for a rotating motor. In accordance with an alternative preferred three-phase embodiment, for every four magnet spacing set there would be three electromagnet spacings. Preferably, the timing of the three-to-four configuration would be controlled in the same manner as for the two-to-three configuration; where the 2:3 configuration has two preferably identical circuits as illustrated in FIGS. 3 and 4, the 3:4 configuration preferably has three identical circuits. Where the 2:3 configuration spaces the two Hall effect sensors (shown electrically in FIG. 4) such that transition events occur five degrees apart, the 3:4 configuration preferably spaces three of them such that transition event occur three and one-half degrees apart.

In accordance with such 3:4 embodiments of the present invention, reduced torque ripple tends to be produced (the discussion herein is without being bound by theory). In the minimal arrangement, the 4:6 (2:3) configuration tends to produce two force timings that are optimally phased one quarter period apart. Generally, there is a point in time when half of these timings change phase and are not appreciably contributing to torque immediately before and after this event. The 3:4 configuration of preferred embodiments, however, has been determined to produce force timings that are more optimally spaced one-sixth period apart and each of the phases also goes through zero; however, while one goes through zero, the two others are producing a force. The resulting summation of forces contains less ripple due to the more closely spaced force maximums and because the minimum forces are higher due to the fact that two are always applying a force.

In accordance with such embodiments, the advantages can also be obtained with a 4:5 arrangement and so on. In accordance with such embodiments, the number of phases may be optimized for the particular application. Let N represent the number of phases; in accordance with such embodiments, the ratio of permanent magnets to coils is N+1 to N; thus, for a two-phase embodiment, the ratio of permanent magnets to coils is 3:2; for a three-phase embodiment, the ratio of permanent magnets to coils is 4:3; for a four-phase embodiment, the ratio of permanent magnets to coils is 5:4; for a five-phase embodiment, the ratio of permanent magnets to coils is 6:5; for a six-phase embodiment, the ratio of permanent magnets to coils is 7:6, and so on. In accordance with alternative preferred embodiments, the number of phases is controlled/determined to be less than ten, or alternatively less than eight, or alternatively less than six, or alternatively four or less. Also, as will be appreciated by those of skill in the art based on the teachings herein, a ratio of 3:2 encompasses 6:4, 9:6, 12:8, 15:10, etc. (i.e., 3x:2x, where x is an integer), a ratio of 4:3 encompasses 8:6, 12:9, 16:12, 20:15, etc. (i.e., 4x:3x, where x is an integer), a ratio of 5:4 encompasses 10:8, 15:12, 20:16, 25:20, etc. (i.e., 5x:4x, where x is an integer); more generally, in accordance with such embodiments, based on the desired degree of torque, torque ripple, and other cost/performance considerations, the ratio of permanent magnets to coils is controlled/determined to be Nx:(N−1)x, where x is an integer, etc.

Figure 12A:
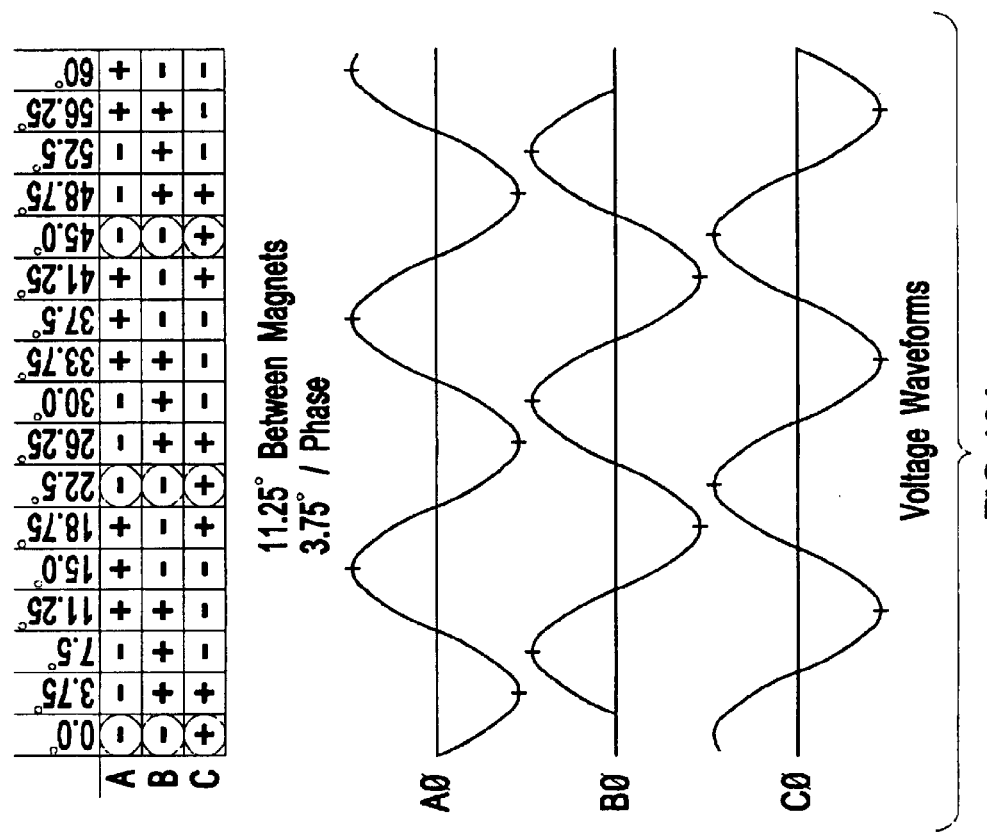
Figure 12B:
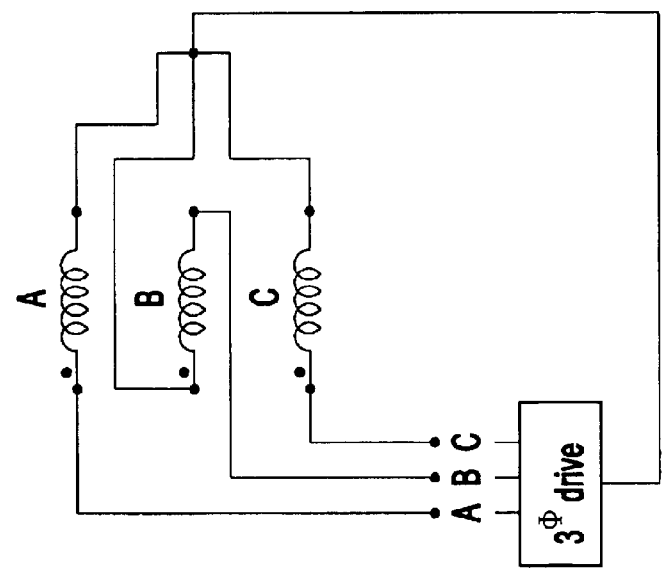
Figure 12C:
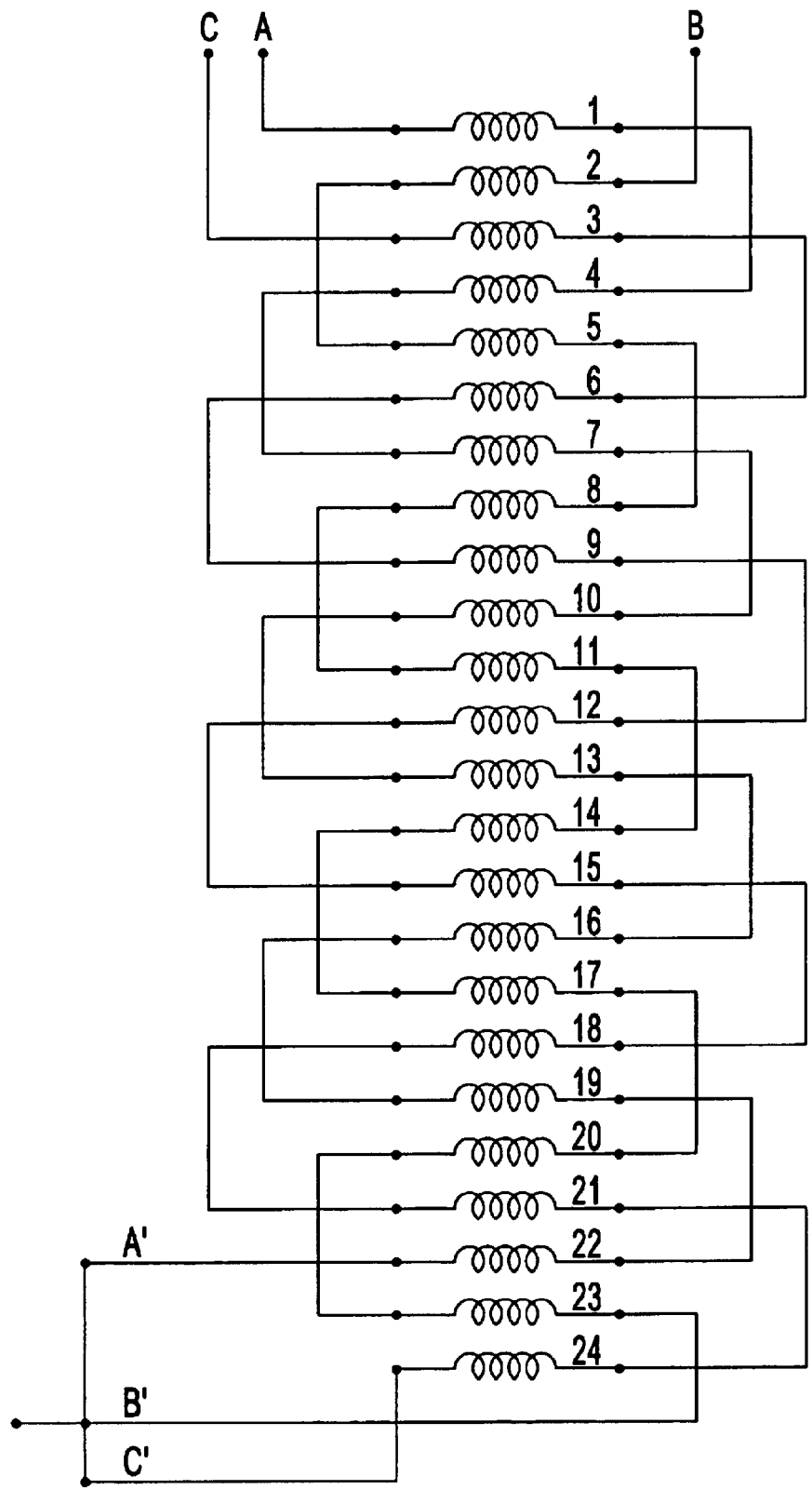
Figure 12E:
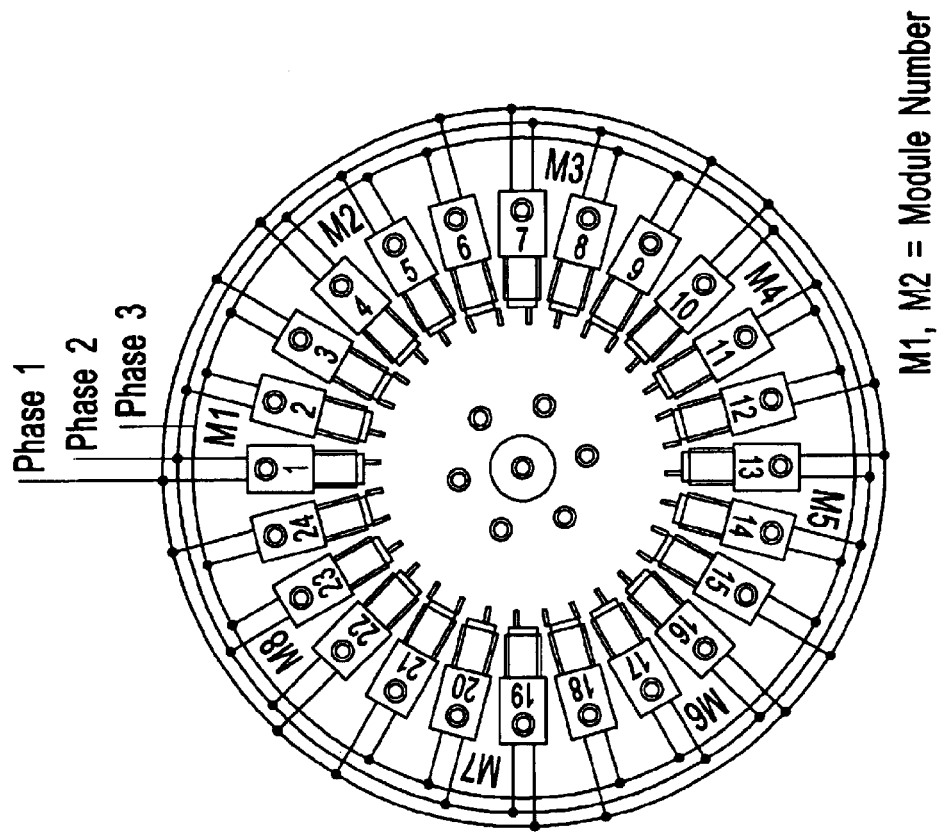
Figure 12D:
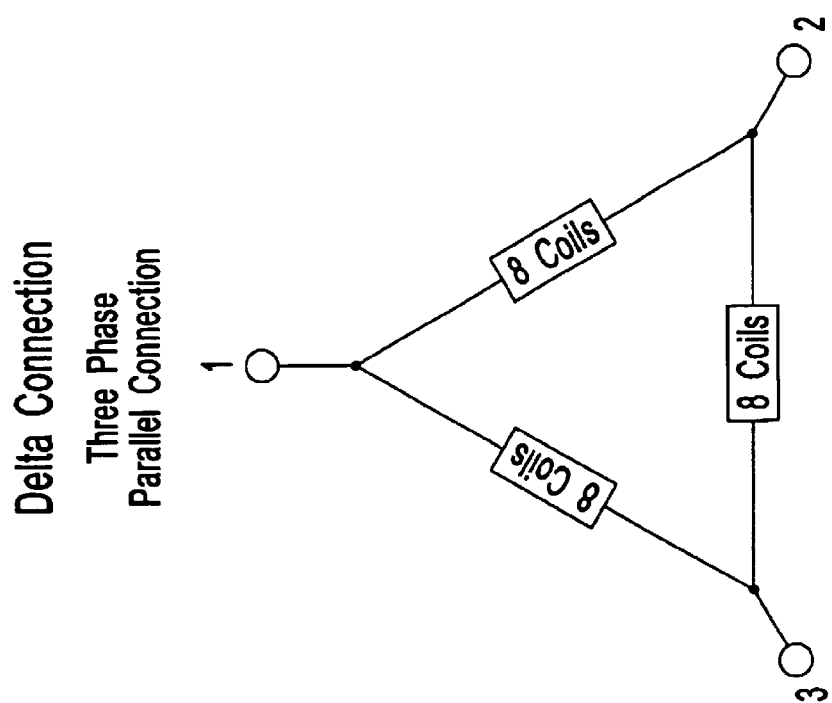
Figure 12G:
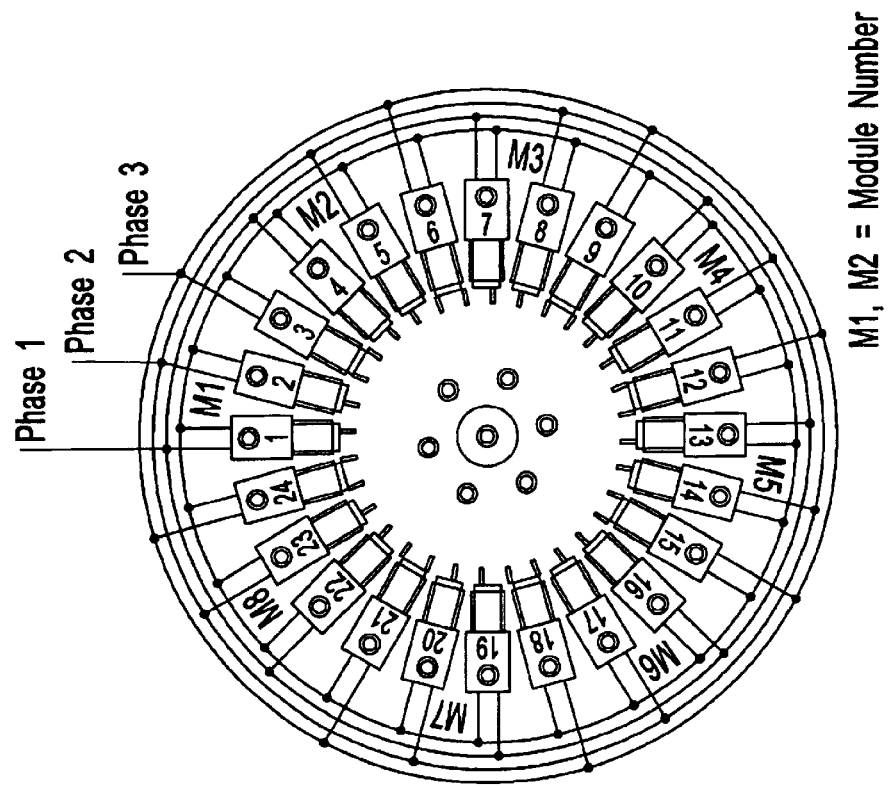
Figure 12F:
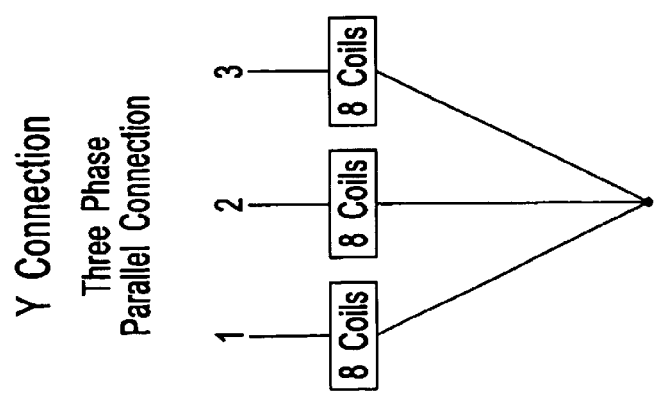

FIGS. 12A–12G illustrate additional aspects of a 4:3 configuration, three phase preferred embodiment of the present invention. In accordance with FIG. 12A, an exemplary three-phase voltage waveform and associate +/− force table are illustrated, based on an exemplary approximately 11.25 degree spacing between magnets and 3.75 degrees/phase. As illustrated, the A, B, C voltage polarities/permanent magnet configuration can be arranged so that two phases are substantially producing torque in each phase timing. FIG. 12B illustrates exemplary three-phase control electronics from a three phase motor control module, while FIG. 12C illustrates a plurality of A, B and C phase electromagnet coils connected in series. FIGS. 12D and 12E illustrate in greater detail a three embodiment based on a three phase delta electrical connection; in the illustrated embodiment, 24 electromagnets (i.e., eight modules, three coils per module) are substantially uniformly arranged around the circumference of the rotating disk, with 32 permanent magnets on the disk, not expressly shown in FIG. 12E. FIGS. 12F and 12G illustrate in greater detail a three embodiment based on a three phase Y electrical connection; in the illustrated embodiment, 24 electromagnets (i.e., eight modules, three coils per module) are substantially uniformly arranged around the circumference of the rotating disk, with 32 permanent magnets on the disk, not expressly shown in FIG. 12G.

Also in accordance with additional preferred embodiments, improved torque performance is achieved by non-uniform coil-phase pairings. For example, for the 3:2/6:4 type configuration, in accordance with such additional embodiments two or more coil-phase pairs are shifted in phase so that the maximum forces of one pair are coincident in time with the pair producing minimum force. Similarly, in yet other alternative preferred embodiments, such coil-phase shifting is applied to the N+1:N polyphase configurations to provide yet further improved torque characteristics.

In yet other preferred embodiments, electrical timing optimizations are applied to provide further improvements in performance. As will be appreciated, the motor architecture in accordance with preferred embodiments of the present invention typically is implemented with higher pole counts than conventional motors. In accordance with the present invention, a motor revolution may see 18 or more pole pairs pass an electromagnet face. For purposes of this discussion, a cycle is considered to be the complete passing of a pole pair past one of these faces. The point in this cycle where the electromagnets are turned on to produce a north pole or a south pole must be precisely controlled in order to produce optimal performance. For angular velocities where the time for a cycle is significantly long with respect to the electrical time constant of the electromagnet (e.g., about four or more), the point in time where the polarity is optimally changed is when the center of a permanent magnet coincides axially with the center of an electromagnet face. For higher angular velocities, however, it has been determined that performance is improved by advancing the polarity switch point in time. In accordance with exemplary preferred embodiments, an advance on the order of around 10% of the cycle time (i.e., e.g., 2 degrees of revolution for an 18 pole motor) produce more optimal performance when this cycle time reduces to about 60% of the electrical time constant of the electromagnet. More generally, in accordance with such embodiments, the N-phase electrical excitation is phase advanced based on the angular velocity of the motor depending upon the electrical time constant of the electromagnets.

In yet other alternative embodiments, "dead time" preferably is inserted in the electrical excitation. In accordance with the present invention, the forces produced by the repulsion and/or attraction of the electromagnet/permanent magnet pairs are more effective at certain angular relationships between these pairs. Little is gained when the force vector is very close to the magnet axis, but the gain increases rapidly as the angle between the torque vector and the magnet axis increases. The energy cost of the torque vector, however, remains essentially fixed regardless of the angle it is operating over. By turning off the current to the electromagnet during a time when the above angle is small, it has been determined that little penalty is pain in reduced torque, while a proportionally larger gain is achieved in reduced energy input. In accordance with such embodiments, the overall efficiency is improved by such selection current switch-off to the electromagnets. Such "dead time" insertion generally may be applied in the general N+1:N configuration.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

As will be understood by a person of ordinary skill in the present art, the examples discussed here are representative of the full spirit and scope of the present invention. Additional variations, some of which are described here, incorporate many aspects of the present invention.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. An electromotive machine comprising a stator element and a rotor element, wherein the stator element comprises at least one set of a plurality of toroidally shaped electromagnetic members, wherein each of the at least one set of toroidally shaped electromagnetic members arranged along an arc a predetermined distance apart defining a stator arc length, each of the electromagnetic members having a slot, wherein the rotor element comprises a disc adapted to pass through the slots of the electromagnetic members, the disc containing a plurality of permanent magnet members spaced side by side about a periphery thereof and arranged so as to have alternating north-south polarities, the permanent magnet members being sized and spaced such that within the stator arc length the ratio of electromagnetic members to permanent magnet members is N to N+1, and wherein N equals a number of electrical excitation phases applied to the electromagnetic members, and wherein when operating as a motor the electromotive machine is self-starting.

2. The electromotive machine of claim 1, wherein:

each of the electromagnetic members having a core providing a magnetic path passing through the slot, the plurality of permanent magnet members arranged to pass through the magnetic path in the slot.

3. The electromotive machine of claim 2, wherein the ratio of electromagnetic members to permanent magnet members is based on a relationship of two to three.

4. The electromotive machine of claim 3, further comprising Hall effect sensors, wherein the Hall effect sensors are positioned on the stator assembly and provide timing signals for controlling the selective energizing of the electromagnetic members.

5. The electromotive machine of claim 4, wherein the electromagnetic members are selectively energized so as to provide four repeating commutation intervals.

6. The electromotive machine of claim 1, wherein a control module controls the electromotor to operate as a motor in a first mode of operation and to operate as a generator in a second mode of operation.

7. The electromotive machine of claim 1, wherein the electromagnetic members are selectively energized so as to provide 2N (two times the number of electrical excitation phases) repeating commutation intervals.

8. A self-starting electromotor, comprising:

a stator element comprising at least one set of a plurality of toroidally shaped electromagnetic members, each of the electromagnetic members having a core defining a slot, each electromagnetic member adapted to respond to an electrical excitation phase to provide a magnetic path through the slot, wherein each of the at least one set of a plurality of toroidally shaped electromagnetic members are arranged along an arc a predetermined distance apart defining a stator arc length wherein the slots are aligned with each other; and a rotor element comprising a disc having a plurality of permanent magnet members spaced side by side about a periphery thereof and arranged so as to have alternating north-south polarities, the permanent magnet members adapted to pass through the slots of the electromagnetic members, the permanent magnet members being sized and spaced such that within the stator arc length the ratio of electromagnetic members to permanent magnet members is N to N+1, and wherein N also equals a number of electrical excitation phases applied to the electromagnetic members.

9. The electromotor of claim 8, further comprising Hall effect sensors, wherein the Hall effect sensors are positioned on the stator element and provide timing signals for controlling the selective energizing of the electromagnetic members.

10. The electromotor of claim 8, wherein the electromagnetic members are selectively energized so as to provide four repeating commutation intervals.

11. The electromotor of claim 8, wherein a control module controls the electromotor to operate as a motor in a first mode of operation and to operate as a generator in a second mode or operation.

12. The electromotor of claim 8, wherein the ratio of electromagnetic members to permanent magnet members is based on a relationship of two to three.

13. The electromotor of claim 8, wherein the ratio of electromagnetic members to permanent magnet members is based on a relationship of three to four.

14. The electromotor of claim 8, wherein the ratio of electromagnetic members to permanent magnet members is based on a relationship of four to five.

15. The electromotor of claim 8, wherein the ratio of electromagnetic members to permanent magnet members is based on a relationship of five to six.

16. The electromotor of claim 8, wherein the ratio of electromagnetic members to permanent magnet members is based on a relationship of six to seven.

* * * * *

UNITED STATES PATENT AND TRADEMARK OFFICE
CERTIFICATE OF CORRECTION

PATENT NO. : 6,930,433 B2
DATED : August 16, 2005
INVENTOR(S) : Bales et al.

It is certified that error appears in the above-identified patent and that said Letters Patent is hereby corrected as shown below:

<u>Title page,</u>
Item [75], Inventors, should include -- Edward Failing Ritz, Jr., Portland, OR --.

Signed and Sealed this

Twenty-seventh Day of December, 2005

JON W. DUDAS
*Director of the United States Patent and Trademark Office*